United States Patent
Cometto et al.

(10) Patent No.: US 7,783,805 B2
(45) Date of Patent: Aug. 24, 2010

(54) INTERLOCKING INPUT/OUTPUTS ON A VIRTUAL LOGIC UNIT NUMBER

(75) Inventors: Maurilio Cometto, Fremont, CA (US); Arindam Paul, Sunnyvale, CA (US); Varagur V. Chandrasekaran, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 244 days.

(21) Appl. No.: 11/606,846

(22) Filed: Nov. 29, 2006

(65) Prior Publication Data

US 2008/0126647 A1 May 29, 2008

(51) Int. Cl.
G06F 12/14 (2006.01)
G06F 12/00 (2006.01)
G06F 15/16 (2006.01)
(52) U.S. Cl. .................. 710/200; 709/210; 709/225
(58) Field of Classification Search .......... 710/200; 709/210, 225
See application file for complete search history.

(56) References Cited

U.S. PATENT DOCUMENTS

| 7,328,263 | B1* | 2/2008 | Sadjadi ............... 709/225 |
| 2003/0172149 | A1* | 9/2003 | Edsall et al. ........... 709/224 |
| 2004/0220913 | A1* | 11/2004 | Walker ................. 707/3 |
| 2007/0094464 | A1* | 4/2007 | Sharma et al. ......... 711/162 |
| 2007/0094466 | A1* | 4/2007 | Sharma et al. ......... 711/162 |
| 2008/0034167 | A1* | 2/2008 | Sharma et al. ......... 711/152 |
| 2008/0126693 | A1* | 5/2008 | Cometto et al. ........ 711/108 |
| 2008/0126726 | A1* | 5/2008 | Cometto et al. ........ 711/163 |

OTHER PUBLICATIONS

"Cluster Project Page", www.sources.redhate.com/cluster, Aug. 22, 2006.
"Distributed Lock Manager", www.wikipedia.org/wiki/distributed_lock_manager, Jul. 19, 2006.
Ghemawat et al., "The Google File System", 19th ACM Symposium on Operating System Principles, Lake George, NY, Oct. 2003.
Schobel-Theuer et al., "Generalized Optional Locking in Distributed Systems", Parallel and Distributed Computing and Systems (PCDS 2004).
"Red Hat Cluster Suite: Configuring and Managing a Cluster", Copyright 2000-2006.

* cited by examiner

Primary Examiner—Ryan M Stiglic
(74) Attorney, Agent, or Firm—Weaver Austin Villeneuve & Sampson LLP (57) ABSTRACT

In one embodiment, a solution is provided wherein a lock client sends lock requests to a lock manager upon receipt of an input/output (I/O) and receives back a lock grant. At some point later, the lock client may send a lock release. The lock manager, upon receipt of a lock release from a lock client, remove a first lock request corresponding to the lock release from a lock grant queue corresponding to the lock manager. Then, for each dependency queue lock request in a dependency queue corresponding to the first lock request, the lock manager may determine whether the dependency queue lock request conflicts with a second lock request in the lock grant queue, and then may process the dependency queue lock request according to whether the dependency queue lock requires conflicts with a second lock request in the lock grant queue.

13 Claims, 11 Drawing Sheets

INTERLOCKING INPUT/OUTPUTS ON A VIRTUAL LOGIC UNIT NUMBER

BACKGROUND

1. Technical Field

The present disclosure relates to storage area networks.

2. Description of the Related Art

Storage Area Networks (SANs) are computer systems in which large mass storage devices such as Redundant Array of Independent Disks (RAID) devices are connected to a central processor or processors via high-speed network technology (as opposed to, for example, via a system bus). SANs are increasingly used to store vast amounts of information and their usage has grown exponentially with the rise of the Internet. Individual physical storage devices may be identified using a Logical Unit Number (LUN). The devices themselves are then often informally referred to as LUNs as well.

Virtualization of the storage area network allows for the organization of the physical devices to be hidden from users. This allows multiple Virtual LUNs (VLUNs) to be created for a single LUN, which gives users of each VLUN the sense that they are accessing there own LUN even though the physical device itself is shared among multiple users.

DESCRIPTION OF EXAMPLE EMBODIMENTS

Overview

In one embodiment, a solution is provided wherein a lock client sends lock requests to a lock manager upon receipt of an input/output (I/O) and receives back a lock grant. At some point later, the lock client may send a lock release. The lock manager, upon receipt of a lock release from a lock client, remove a first lock request corresponding to the lock release from a lock grant queue corresponding to the lock manager. Then, for each dependency queue lock request in a dependency queue corresponding to the first lock request, the lock manager may determine whether the dependency queue lock request conflicts with a second lock request in the lock grant queue, and then may process the dependency queue lock request according to whether the dependency queue lock requires conflicts with a second lock request in the lock grant queue.

Example Embodiments

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order to not obscure the present invention.

The input and output from and to hosts and storages in a SAN are known collectively as the SAN's exchange, or flow. The exchange is typically measured in Input/Outputs (I/Os). Traditionally, each input or output was sent by a host and terminated at a storage, or vice-versa. This is because the application that would be transmitting or interpreting the I/O was located at either a host or a storage. Since the present document describes moving the application to the switch, in an embodiment I/Os may be terminated at the switch (or some other located in between the host and the storage). It should be noted that the term "storage" as used throughout this document shall refer to either a single storage device or a group of storage devices.

Figure 1:
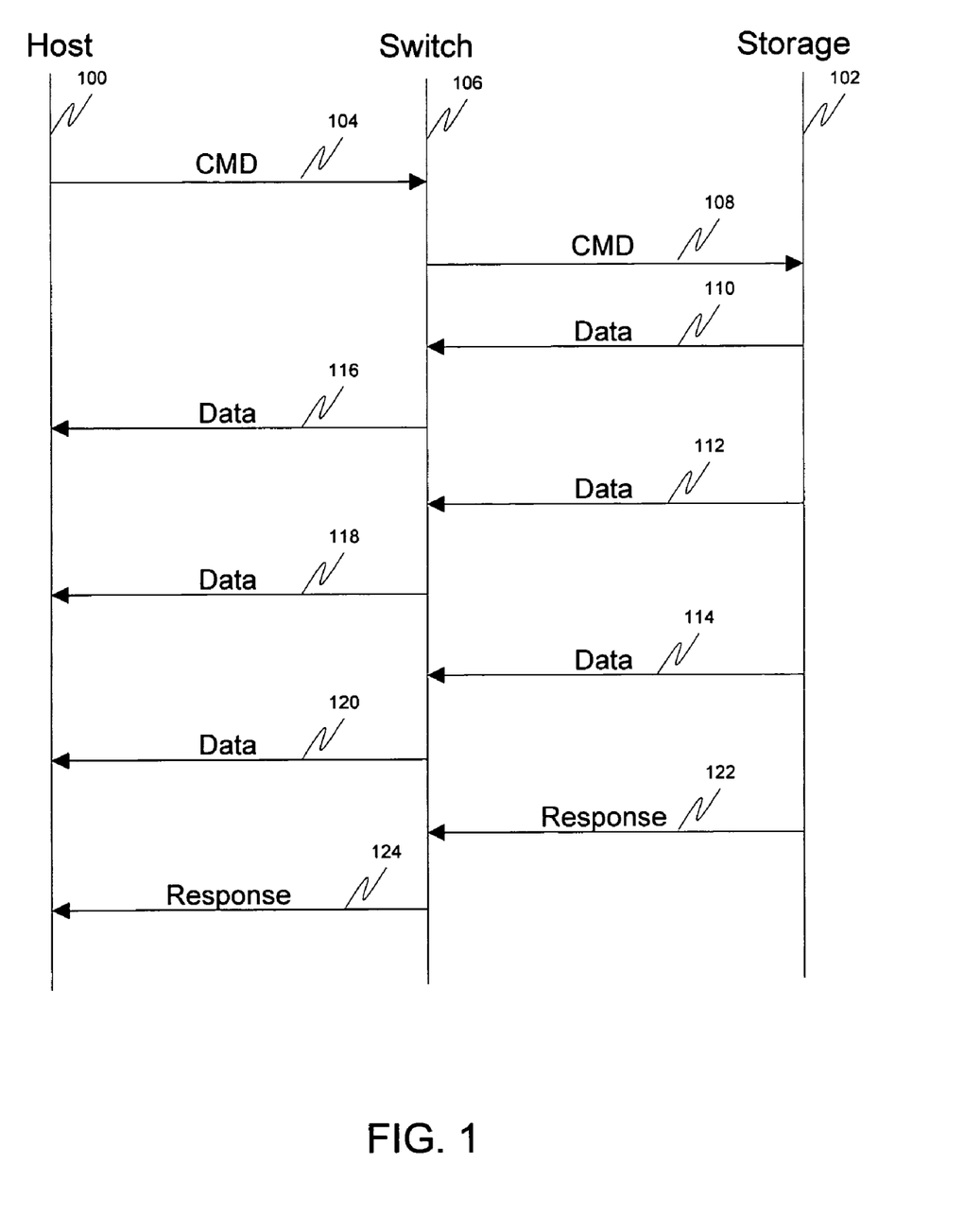
FIG. 1 is an example of a command executed in a SAN.

FIG. 1 is an example of a command executed in a SAN. The command in this figure is a read request. Rather than communications occurring directly between host 100 and storage 102, the command 104 may first be terminated at the switch 106. The switch 106 then may perform one or more processes on the commands, and then may generate a resulting command 108 for communication to the storage 104. The same is true of data messages 110, 112, 114, which may then be terminated at the switch 106, where processes may be performed upon them prior to the data 116, 118, 120 being replayed to the host 100. The response 122 may also be terminated at the switch 106, and possibly also undergoing a translation, prior to being sent as response 124.

In one embodiment, customized hardware may be utilized that is compatible with a standard switch. Such an embodiment avoids the necessity of modifying the switch itself. This hardware may be known as a storage services module (SSM), which may be a blade or line card that plugs into the switch and comprises hardware and software. Alternative embodiments are possible where the switch itself is utilized, or where alternative hardware and/or software is utilized.

Figure 2:
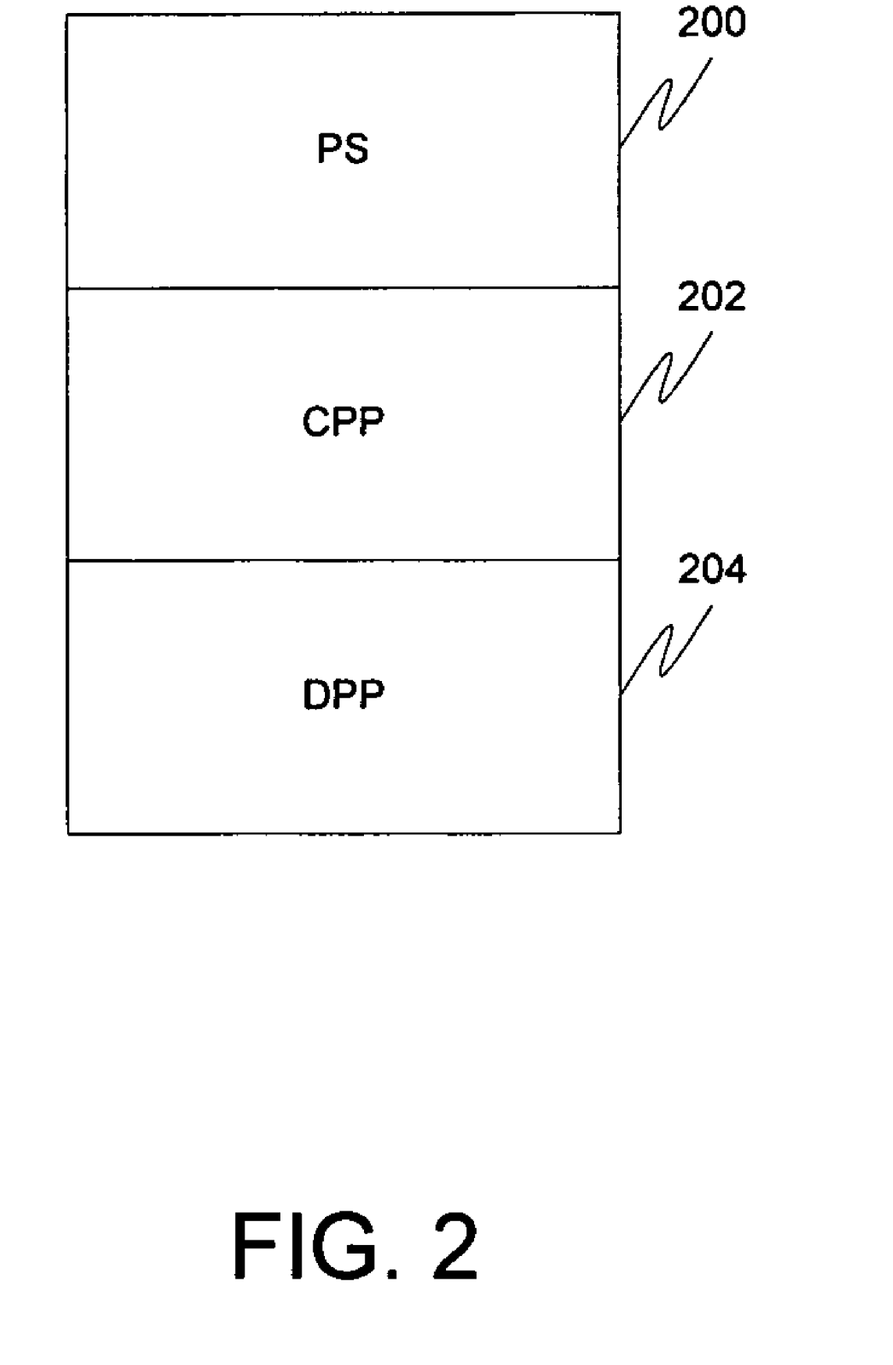
FIG. 2 is an example software stack.

In an embodiment of the present invention, the software utilized may be split into three separate parts. FIG. 2 is an example software stack. Partner Software (PS) layer 200 may include the underlying application to be run. A Control Path Processor (CPP) layer 202 may control the software and hardware. A Data Path Processor (DPP) layer 204 may be where the application processes themselves may be executed. Each DPP essentially represents a single processor or core in a multi-processor or multi-core environment.

One common protocol used to communicate within a SAN is the Small Computing System Interface (SCSI). Hosts can communicate at high speed via the SCSI protocol by utilizing Fibre Channel (FC) switching technology. Recent advancements have allowed such communications to occur at up to 10 Gb/s using 10 Gb/s FC or the 10 Gig Ethernet standards. It would be advantageous, therefore, for the complex virtualization functions performed by SAN switches to also be performed at 10 Gb/s, lest a bottleneck be created. Unfortunately, the single processor architecture that is common in most switches is not a viable solution for these levels of line speeds. For such speeds, multi-processor or multi-core processor technology may be utilized.

One important feature of a virtualization infrastructure is the ability to export a VLUN at any point throughout the network via multiple Storage Services Modules. In other words, a single VLUN may be exported to different DPPs (in the same or in different physical switches). This VLUN may then be accessed using any of the switches to which the VLUN has been exported. This implies, however, that the same underlying volume may be accessible by different hosts at the same time. Without a mechanism to serialize write access to the backend volume, there is a very real danger of data corruption.

The responsibilities of providing interlocking and serialization of I/Os may be divided among three different entities. A lock manager may be provided to assign (grant) locks and keep track of lock ownership. It may maintain a database of locks. In one embodiment, each shared volume may have exactly one lock manager. However, other embodiments are possible wherein a shared volume may have more than one lock manager (for example, if the shared volume is split into discrete regions). A lock client may then request locks from the lock manager to lock a region before commencing an I/O. The lock client may also release the lock to the lock manager after the I/O completes. Each shared volume may have multiple lock clients. In other words, each VLUN may have a single lock manager and multiple lock clients. The lock clients may be located at each DPP to which the VLUN was exported, wherein the lock manger may be located at a DPP close to one of the DPPs having a lock client (or even on the same DPP as a lock client).

Finally, control software may be used to configure the lock manager and lock clients. The control software may be aware of the topology of the network and about all the points where a certain VLUN has been exported. The control software may then be responsible for correctly configuring the lock clients at every place where virtual storage-VLUN pairs (fronting the same shared underlying volume) have been instantiated.

Figure 3:
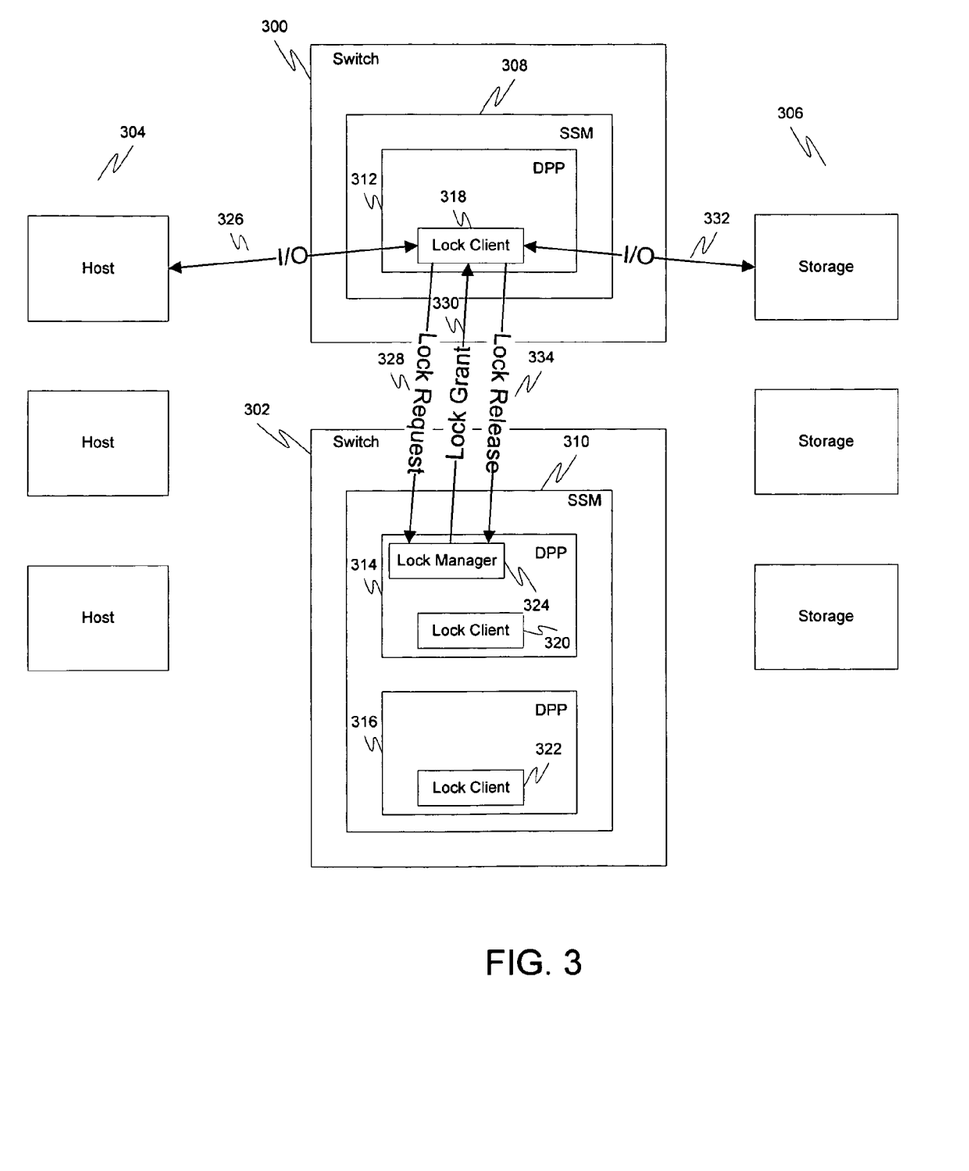
FIG. 3 is an example Virtual SAN (VSAN).

FIG. 3 is an example Virtual SAN (VSAN). Here, a VSAN may be defined over Switch 300 and Switch 302. Both switches may be located between one or more hosts 304 and one or more storages 306. Switch 300 may include SSM 308 and switch 302 may include SSM 310. SSM 308 may include SPP 312 and SSM 310 may include DPP 314 and DPP 316. For simplicity, the switches, SSMs, and DPPs depicted in FIG. 3 are only those that correlate to a particular VLUN. The same physical devices, or additional switches, SSMs, and DPPs may be used for other VLUNs. For example, SSM 308 is depicted with only a single DPP 312, however in reality, it would likely have other DPPs as well, but only the DPP associated with this VLUN is depicted.

Each DPP associated with a particular VLUN may have a lock client 318, 324, 322. Additionally, a lock manager 324 may be associated with the VLUN on one of the DPPs. When the host sends an I/O 326, lock client 318 may intercept it and issue a lock request 328 to lock manager 324. Lock manager may then assign a lock and send back lock grant 330. The lock client 318 may then send I/O 332 to a storage. Once the I.O is complete, the lock client 318 may send a lock release 334 to lock manager 324. This entire process is described in more detail below.

Figure 4:
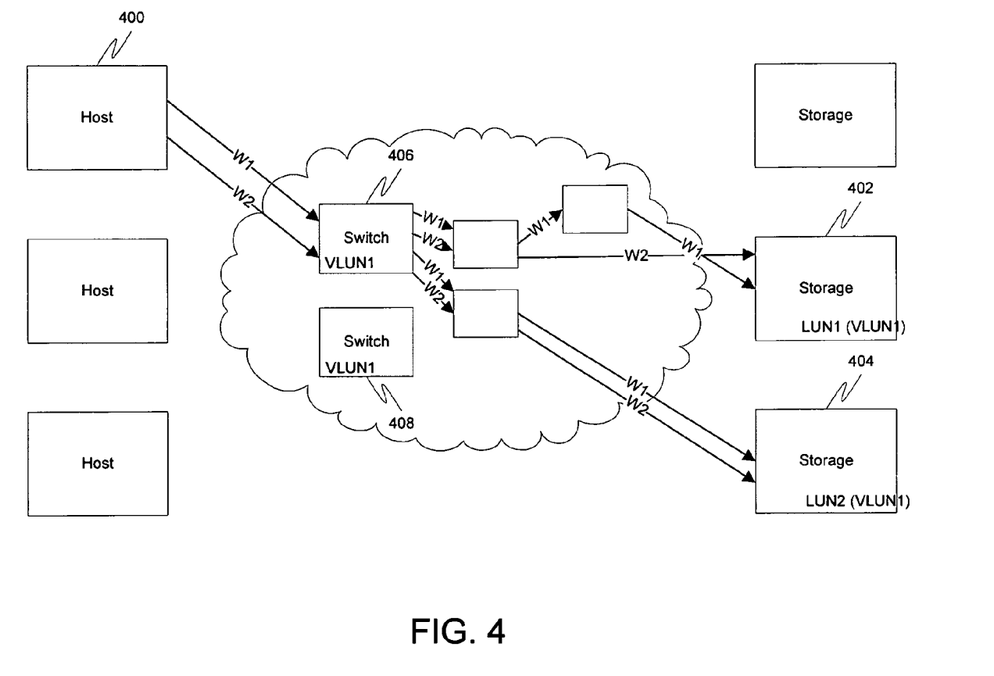
FIG. 4 illustrates an AB-BA problem.

In an example embodiment, a protocol may be utilized that, in essence, "locks" a VLUN region until an I/O is complete. This prevents the region from being corrupted. This interlocking may also be used to solve what may be called an AB-BA problem. FIG. 4 illustrates the AB-BA problem. In the AB-BA problem, there are two I/O requests (W1 and W2) from a host 400 directed to overlapping regions on the same mirrored volume (VLUN1, mirrored on storage 402, with an identification of LUN1, and storage 404, with an identification of LUN2). Additionally, in this example, VLUN1 is exported via two different switches 406, 408, although this is not necessarily relevant to the AB-BA problem.

Without interlocking, the virtualization logic in each DPP may issue the backend I/Os to the physical volume(s) when it receives the writes. Therefore, switch 406 may issue W1 to the mirrored LUN1 and LUN2 when it receives W1. It may then issue W2 to the mirrored LUN1 and LUN2 when it receives W2. These backend I/Os, however, may be routed through different paths in the network and get delayed differently due to different network latencies or network congestions. In the example provided, it can be seen that W1 passes through more hops en route to LUN1 than W2 does, resulting in W2 reaching LUN1 before W2. On the other hand, W1 and W2 reach LUN2 in the original order (W1 then W2). This may immediately render the mirrors inconsistent in that one storage 402 has written W1 then W2 whereas the other storage 406 has written W2 then W1. Using interlocking, W2 may be serialized and the backend I/Os may only be issued after W1 completed and is committed to the mirrors.

The entire shared volume may be logically divided into blocks. These blocks may, for example, be represented by Logical Block Address (LBA), length tuples. Alternatively, a range of logical block addresses may be used. The locks may then be assigned on a per write I/O basis, which means that they may be requested (and assigned) exactly for the region affected by the I/O region.

Lock clients that need to access the shared volume request locks before accessing the volume. The lock clients may request a lock and on obtaining a grant for the lock, hold the lock for such time as needed to complete the I/O. Then the I/O may be released with a single message to the lock manager. The lock manager then may process the next lock request. The lock manager may maintain queues for pending lock requests, including a lock grant queue. If lock requests timeout, or if lock clients receive a rejection, they may communicate it to the control software via exceptions. The control software may then have the responsibility to set up the lock clients and the lock managers properly before commencing I/Os.

As to the lock manager, when a lock request is received, it may first be compared with the requests in the lock grant queue. If a region overlap is found, this means that a prior request for the same region has been granted. Therefore the request that just arrived may be placed in a dependency queue corresponding to the conflicting lock request in the lock grant queue. It should be noted that if no dependency queue exists for the conflicting lock request, one may be created. If no conflict is found, the requested region may be considered available and the lock may be granted (e.g., the grant message may be sent and a lock is queued in the lock grant queue).

It should be noted that the terms "lock grant queue" and "dependency queue" used throughout this document shall be interpreted broadly as any data structures storing lock requests. There is no requirement that these queues be organized in any particular manner at the physical or logical level. Indeed, there is no requirement that theses queues even be ordered, although ordering them may aid in efficiency. In one embodiment, as will be seen below, the lock grant queue is stored as a doubly linked list of lock requests and the dependency queues are stored as singly linked lists, each coupled to a particular lock request in the lock grant queue. Nevertheless, that embodiment represents simply one example and the claims shall not be limited to such data structure implementations.

Each time a lock is released, the dependency queue may be scanned to check if there is any outstanding request that can be granted a lock. The processing of release notifications sent by nodes that are giving up locks also may present different possible scenarios because many releases by different nodes may be necessary in order to grant a lock for a large region. On receipt of a release notification, a lock manager may scan the list of I/Os awaiting access to the resource. If there are pending lock requests, then a reshuffling of the lock list may be conducted prior to granting access to the next eligible I/O.

Figure 5A:
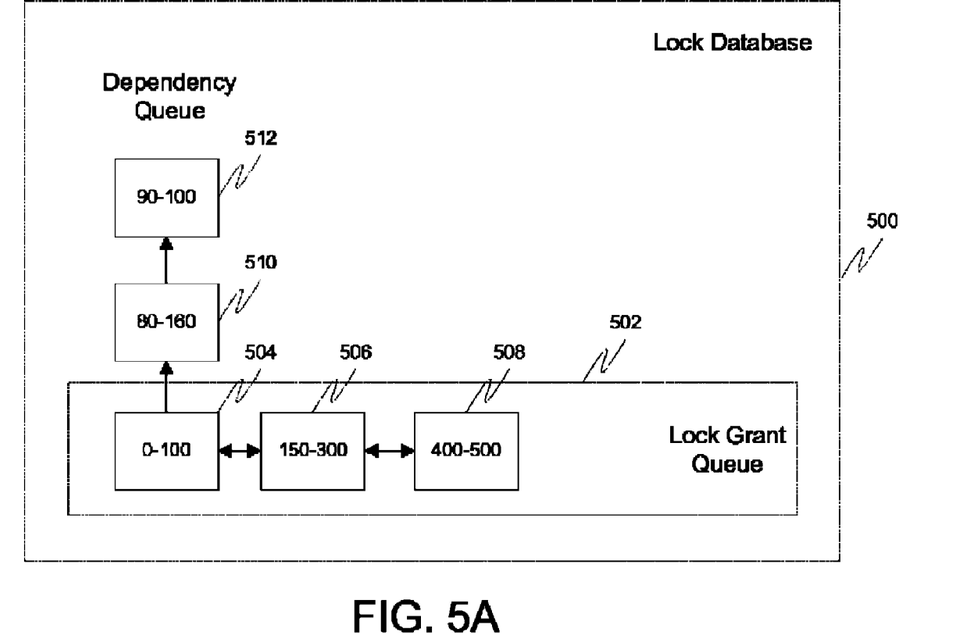
FIGS. 5A-5B are an example a lock database being updated.
Figure 5B:
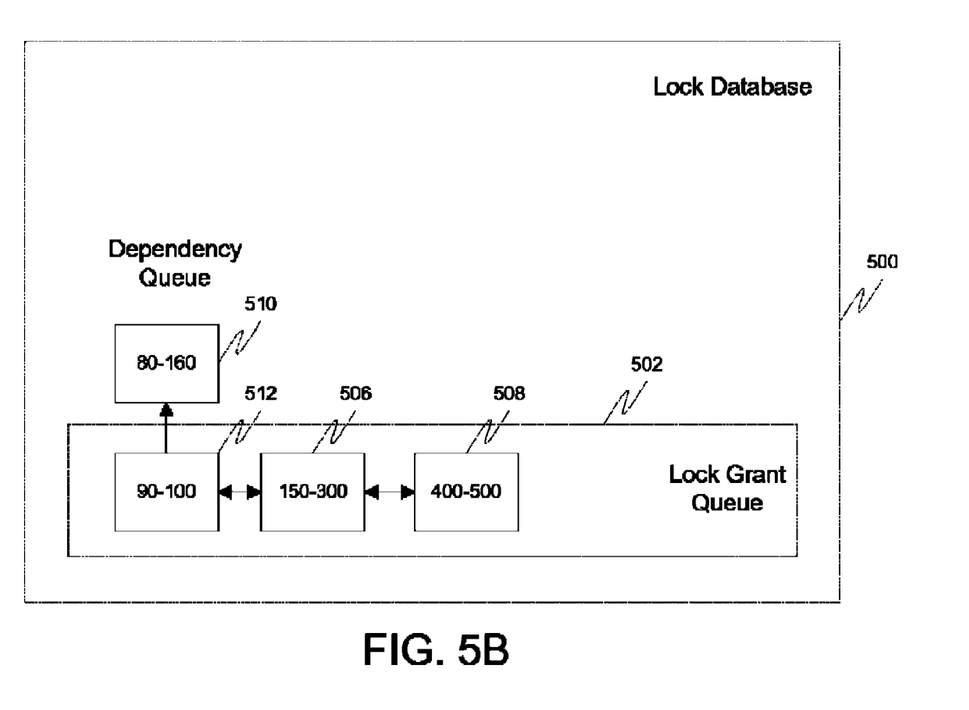

FIG. 5A is an example of a lock database. The lock database 500 contains a lock grant queue 502 that has three active locks, for lock request 504 (region 0-100), lock request 506 (region 150-300), and lock request 508 (region 400-500). Here, lock request 504 has a dependency queue containing two outstanding lock requests, lock request 510 (region 90-100), and lock request 512 (region 80-160). Notably, lock requests 510 and 512 both conflict with lock request 504, which is why they were placed in lock request 504's dependency queue. When the lock for lock request 504 is released, the pending lock requests in its corresponding dependency queue may be processed in First-in-First-Out order. The order of the dependency queue may be reflected by how close the region is to the lock grant queue 502. This aids in reducing the amount of traversal time when a new lock request is added to the dependency queue (in many cases, it eliminates the traversal entirely). Therefore, in the example in FIG. 5A, lock request 512 is actually the lock request that was first added to the dependency queue. As such, when the lock for lock request 504 is released, the "oldest" lock request in the dependency queue is examined to see whether the lock can be assigned. Since no conflict is found between lock request 512 and either lock request 506 or 508 (the lock requests left in the lock grant queue 502), lock request 512 may be granted and placed in the lock grant queue 502. This is depicted in FIG. 5B. It should be noted that throughout this document, when the "oldest" lock request in a queue is described, the term oldest refers to the lock request that has been in that particular dependency queue the longest. This may or may not be the same as the lock request that has gone the longest since it was created. For example, when a lock request moves from one dependency queue to another, it becomes the "newest" lock request in that dependency queue and thus would be considered "newer" than a lock request already in the latter dependency queue that was more recently created.

Figure 6A:
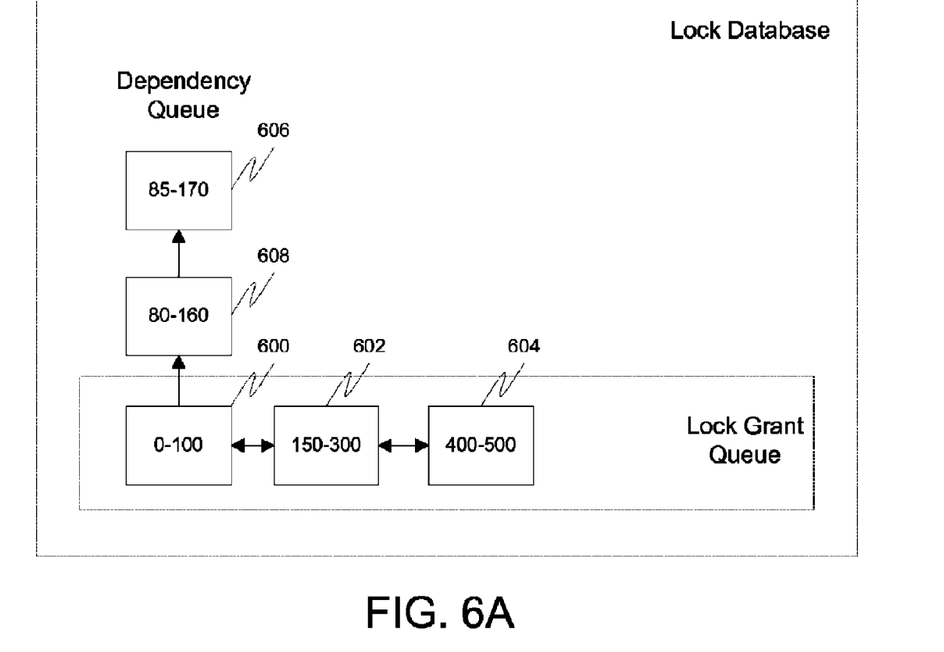
FIG. 6A-6D are another example of a lock database being updated.
Figure 6B:
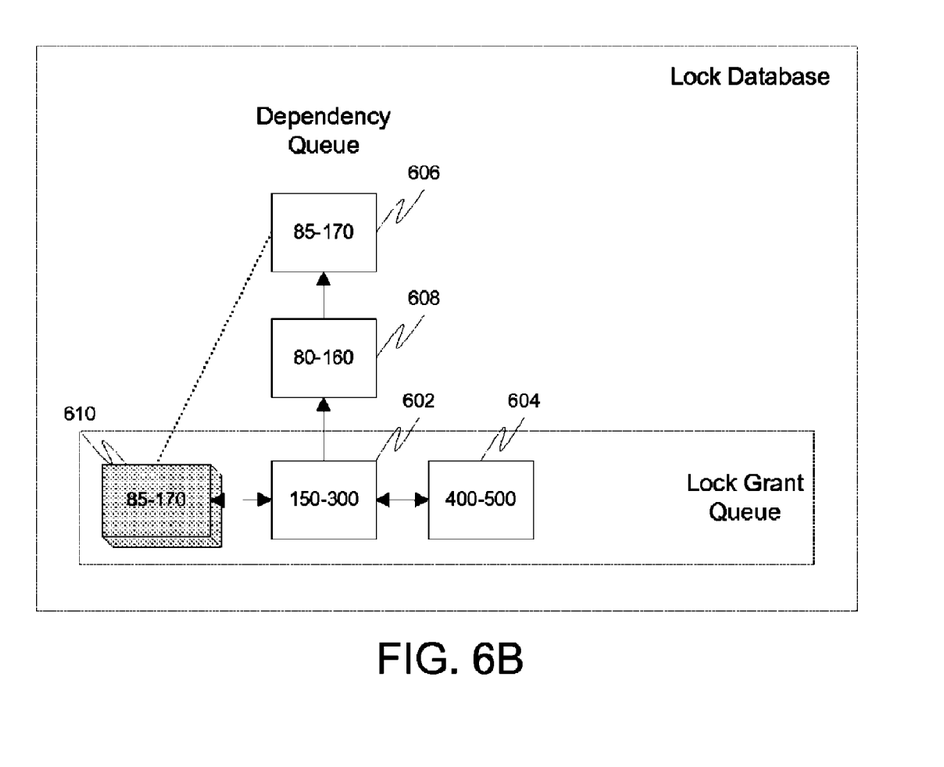

FIG. 6A is another example of a lock database. Here, again the lock database contains three active locks, lock request 600 (region 0-100), lock request 602 (region 150-300), and lock request 604 (region 400-500). Lock request 600 has a dependency queue containing two outstanding lock requests, lock request 606 (region 85-170) and lock request 608 (region 80-160). When the lock for lock request 600 is released, the lock manager determines whether the oldest request in the corresponding dependency queue can be granted. Unlike FIGS. 5A and 5B, however, in this example lock request 606 cannot be locked because it overlaps with lock request 602, which is currently locked (since it is in the lock grant queue). In that case, a shadow lock request 610 for region 85-170 may be placed in the lock grant queue. This ensures that this oldest pending request will be handled before any newer lock request that could potentially block it. This is depicted in FIG. 6B. The shadow lock request 610 may be linked to the actual corresponding lock request 606 to allow the system to easily identify when a lock request has a shadow. This shadow lock request 610 may wind up having a dependency queue of its own, as will be seen below. The shadow lock request 610 is treated the same as any other block in the lock grant queue, except that since it has not actually been assigned a lock yet, the system may assign it a lock prior to assigning any dependency queue lock requests a lock. The lock request 606 is then also placed in the dependency queue for the conflicting lock request 602.

The remaining items in the dependency queue of the released lock request may then be individually checked to determine if they can be serviced as well. If not, then they may be placed in the dependency queue of a conflicting region. It should be noted than in an embodiment of the invention, only one shadow lock request is potentially created when a lock is released, and current dependency queue regions may only be placed in dependency queues of existing regions in the lock grant queue, not in a dependency queue of the newly created shadow region. Thus, lock request 608 may be placed in a dependency queue for lock request 602 as opposed to a dependency queue for shadow lock request 610, even though it potentially conflicts with both. It should be noted that in this example, lock request 602 did not have a dependency queue prior to lock request 606 being placed in one corresponding to it. If lock request 602 did have a dependency queue, then the regions to be added to the dependency queue may be placed as new requests in the dependency queue (e.g., in the location closest to the lock grant queue).

Figure 6C:
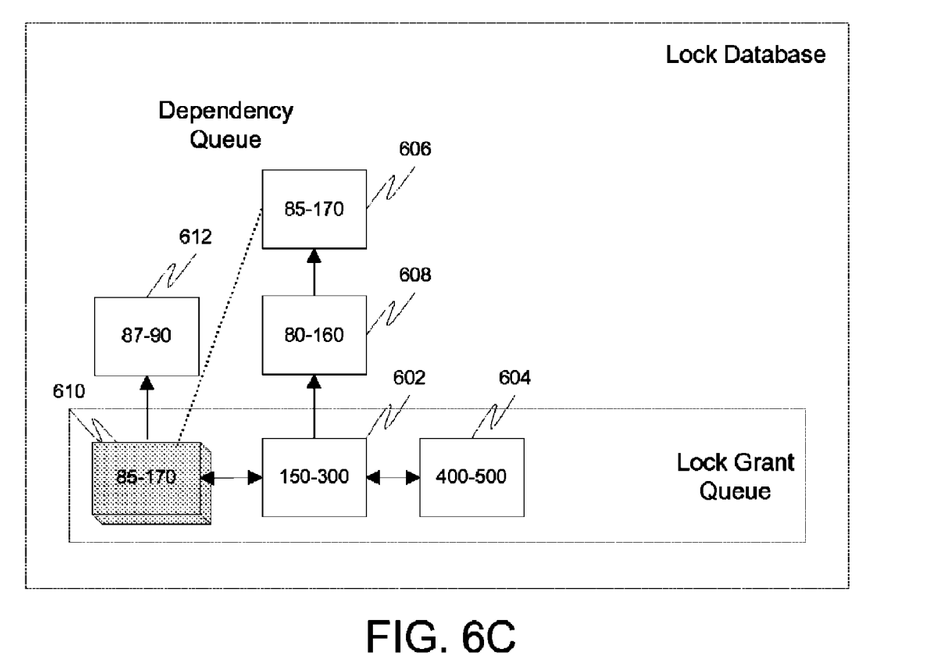

Referring to FIG. 6C, when a lock request 612 is received that overlaps with another lock request in the lock grant queue (in this example, shadow lock request 610), the lock request 612 may be placed in the dependency queue for the conflicting lock request. Here, new lock request 612 does not block lock request 606 because lock request 606 has a shadow region 610 in the lock grant queue. Thus, the system prevented starvation for lock request 606.

Figure 6D:
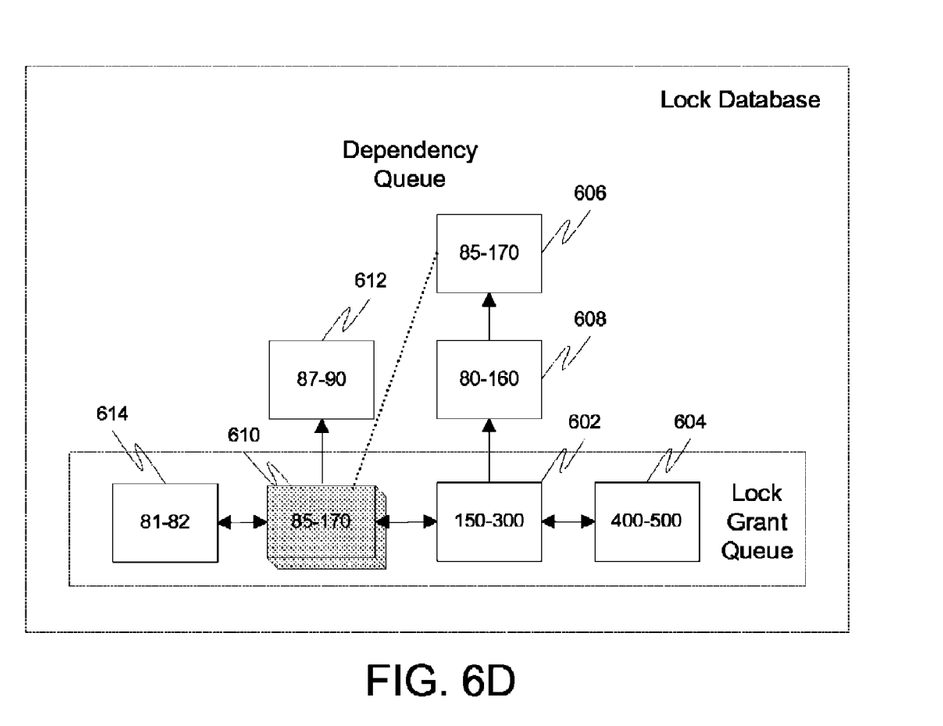

Referring to FIG. 6D, when a lock request 614 is received that does not overlap with a lock request in the lock grant queue, it may immediately get a lock grant and be placed in the lock grant queue, even though there may be other, older overlapping requests that may be pending (e.g., lock request 612). However, when lock request 606/shadow lock request 610 is released, lock request 612 will either get a lock right away or will reserve its new position in the lock grant queue using a shadow entry so that no newer request can starve it at that point.

Timers may be kept for all outstanding messages sent to other nodes. The expiration of a timer may be another event to be processed from the idle state. Timer expiration for messages to other nodes may simply trigger re-transmission of the message until a response is received or until a cluster manager sends notification of the unresponsive node being down or having left the cluster. Context information may be associated with each timer in order to decide which frames to re-transmit.

As to the lock clients, the lock clients may co-reside with the virtual storage-LUN tuple to which mutually exclusive access needs to be provided. When the lock client receives an I/O, it first may be serialized. Then a lock request may be sent to the lock manager for the affected LBA range. The task may be held until a lock grant is received. Once the I/O has completed, a release may be sent back to the lock manager as part of the post-processing.

Fibre Channel Protocol (FCP), as described by ANSI/INCITS 269-1996, is an American National Standards Institute (ANSI) standard defining transmissions in a SCSI network over Fibre Channel. In an embodiment of the present invention, interlock messages are transmitted using FCP as the transport. This innovative use of the FCP protocol allows the leveraging of existing TCAM lookups by the hardware and the minimization of protocol overhead. In this embodiment, a lock request may be sent as an FCP packet using the FCP_CMND command as follows: Lock Request (FCP_CMND) From LOCK_CLIENT to LOCK_MANAGER. A lock grant or rejection may be sent as an FCP packet using the XFR_RDY or FCP_RSP command as follows: Lock Grant (XFR_RDY)/Reject (FCP_RSP) From LOCK_MANAGER to LOCK_CLIENT. A lock release may be sent as an FCP packet using the FCP_DATA command as follows: Lock Release (FCP_DATA) LOCK_CLIENT to LOCK_MANAGER. A lock release acknowledgement may be sent as an FCP packet using the FCP_RSP command as follows: Lock Release Ack (FCP_RSP) From LOCK_MANAGER to LOCK_CLIENT.

By granting the locks in the order in which the lock requests are received, the lock manager is capable of making the protocol starvation free. When a release notification is received, the lock database may be updated and the released region marked as available. Then the dependency queue may be scanned for the original request that triggered the release process for the region. If the request was for a larger region encompassing the one that had just been released, then the lock may not be granted until all subregions have been released by their respective owners. However, in order to prevent starvation for the larger region, the larger region's request may also be inserted in the lock grant queue so that further requests for smaller subregions are in its dependency queue rather than the dependency queue of the region that had just been released. If the region just released is the last one required for the pending request, then the whole super-region may be marked as locked in the database, and the lock may be granted to the node that requested it. Each lock release notification may be acknowledged with a lock release to the notifying client. After granting the lock, the dependency queue may be scanned to check for other requests for the same or overlapping LBA regions(s). If a match is found, then the process may be restarted by looking at the lock grant queue to see if there are conflicts, as specified above.

The described process may be deadlock free because there is no cyclic waiting.

Figure 7:
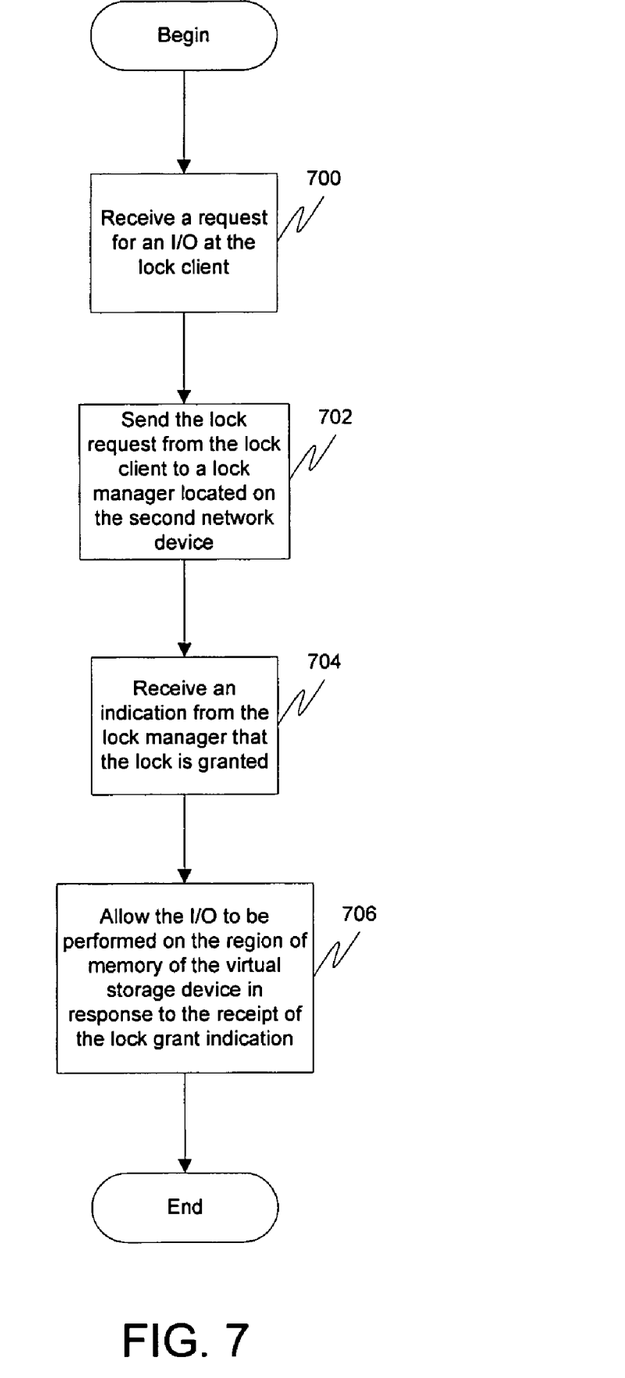
FIG. 7 is an example method for handling a request for an I/O.

FIG. 7 is an example method for handling a request for an I/O. This method may be performed at a lock client located on a first network device in a network including a first network device, a second network device, a host device, and at least one storage device. The I/O may involve a region of memory of a virtual storage device, wherein the virtual storage device includes the at least one storage device. At 700, the request for an I/O may be received at the lock client. At 702, the lock request may be sent from the lock client to a lock manager located on the second network device. It should be noted that the first network device and the second network device do not need to be separate physical devices. They may simply be the same physical device but controlled by different software. Alternatively, for example, they may be different DPPs in an SSM of a network switch. The sending of the lock request may include embedding the lock request in an FCP packet. At 704, the lock client may receive an indication from the lock manager that the lock is granted. Then at 706, the lock client may allow the I/O to be performed on the region of memory of the virtual storage device in response to the receipt of the lock grant indication. It should be noted that while the lock client is waiting for the indication that the lock is granted, the request for the I/O may be placed in a data structure to store it while other commands or requests for other I/Os may be processed.

Figure 8:
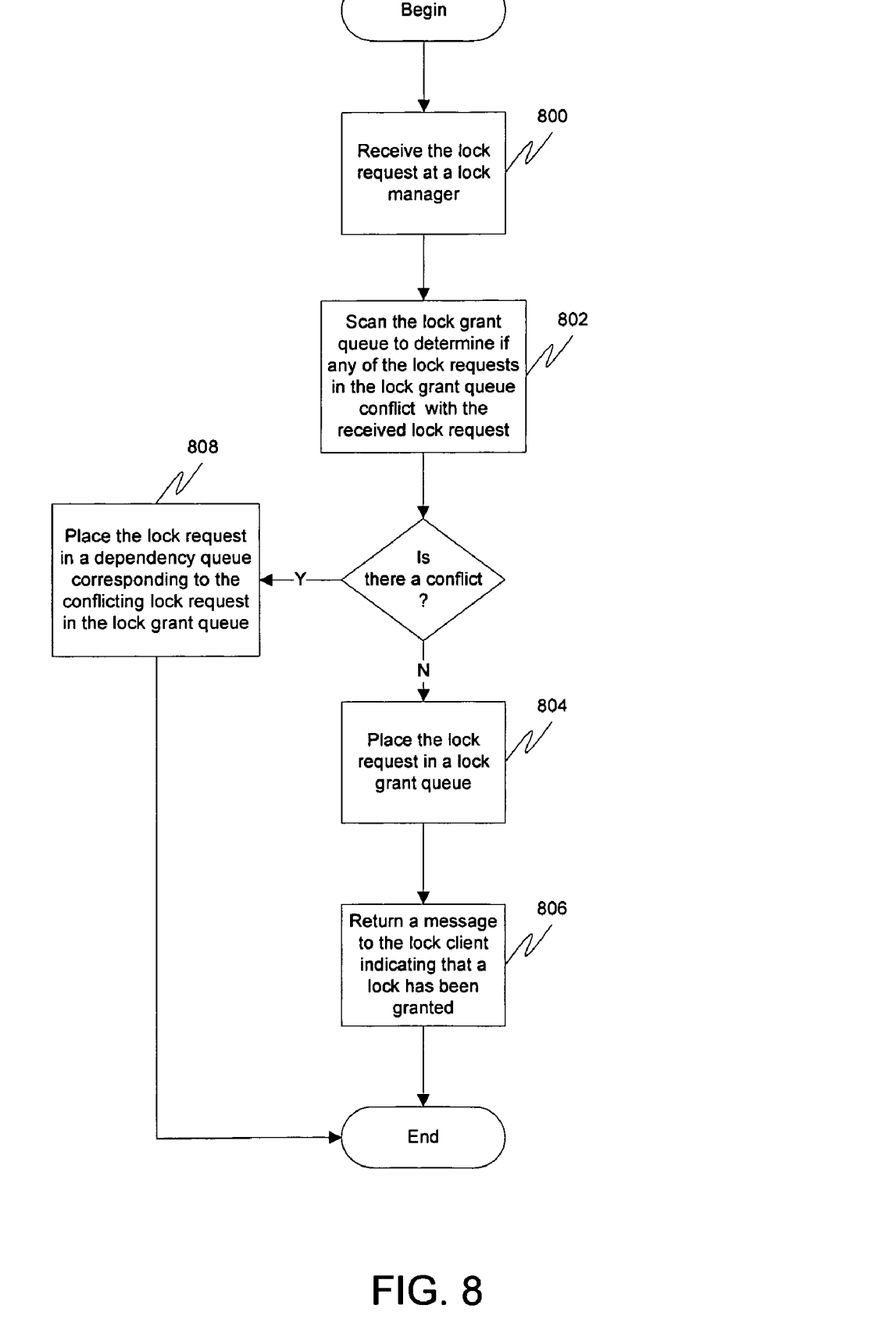
FIG. 8 is an example method for handling a lock request.

FIG. 8 is an example method for handling a lock request. This method may be performed at a lock manager located on a first network device in a network including the first network device, a second network device, a host device, and at lest one storage device. At 800, a first lock request may be received at a lock manager from a lock client. The first lock request may identify a region of memory to lock. At 802, a lock grant queue may be scanned to determine if any of the lock requests in a lock grant queue in a lock database conflict with the first lock request. For purposes of this document, conflicting means that the region identified in the received lock request contains at least some portion of memory in common with a region identified in a lock request already in the lock grant queue. The first lock request may be placed in a queue according to whether the first lock request conflicts with a second lock request. If there is no conflict, then at 804 the first lock request may be placed in the lock grant queue, locking it. At 806, a message may be returned to the lock client, indicating that a lock has been granted (which allows the lock client to proceed with the I/O). If there was a conflict, however, then at 808 the first lock request may be placed in a dependency queue corresponding to the second, conflicting, lock request. This may include, if the dependency queue already exists for the second lock request, placing the first lock request in a position in the dependency queue that does not require the traversal of any other lock requests in the dependency queue. In the embodiment where the dependency queue is a linked list coupled to the second lock request in the lock grant queue, this position may simply be the position closest to the second lock request.

Figure 9:
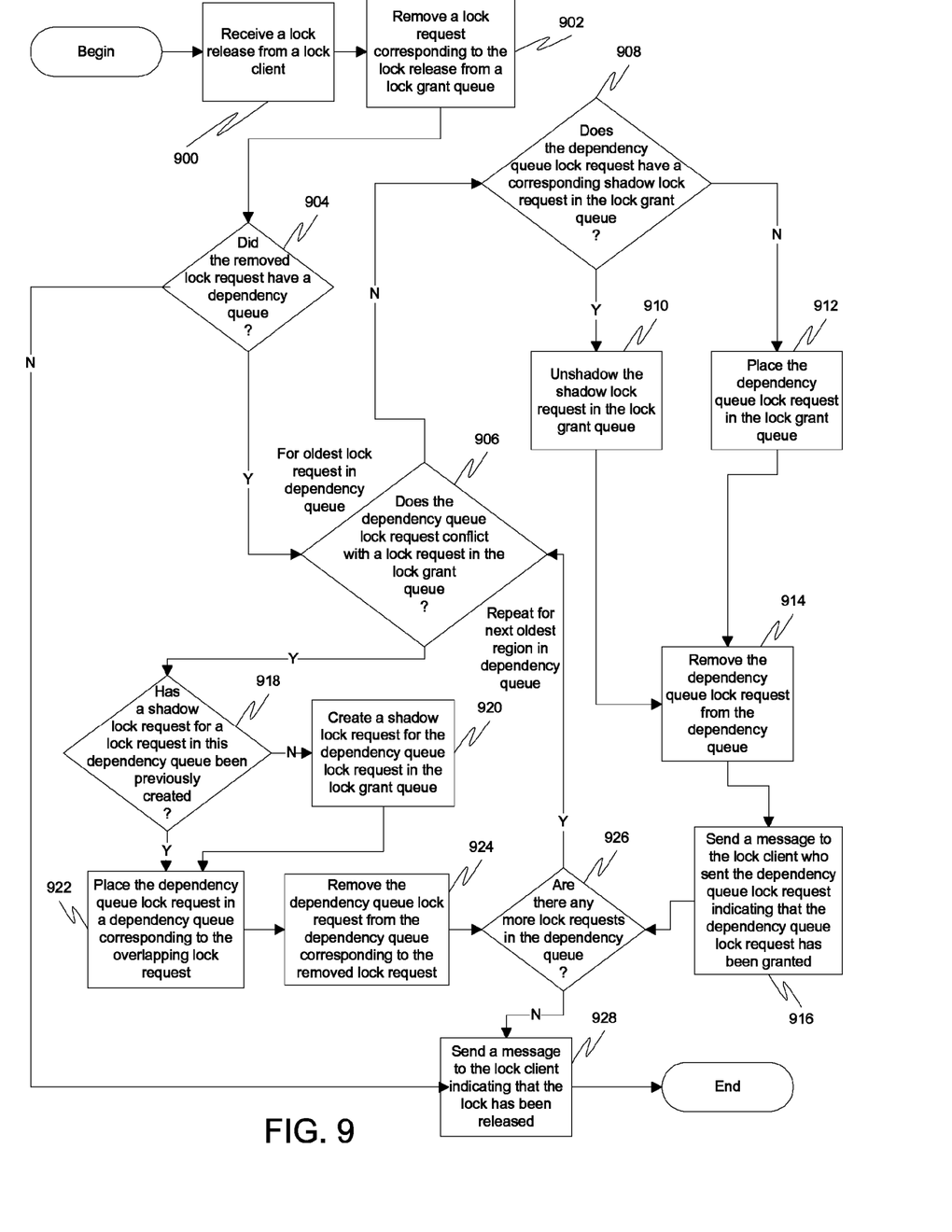
FIG. 9 is an example method for handling a lock release.

FIG. 9 is an example method for handling a lock release. At 900, the lock release may be received at a lock manager from a lock client. The lock manager may be located on a first network device in a network including the first network device, a second network device, a host device, and at least one storage device. At 902, a first lock request corresponding to the lock release may be removed from a lock grant queue. At 904, it may be determined if the first lock request had a dependency queue. If so, then the lock requests in the dependency queue (for simplicity, called the dependency queue lock requests) need to be handled. As such, a loop may be entered that continues for each dependency queue lock request. This loop may begin with the oldest lock request in the dependency queue. At 906, it may be determined if the dependency queue lock request conflicts with a second lock request in the lock grant queue. The dependency queue lock request may be processed according to whether the dependency queue lock request conflicts with a second lock request in the lock grant queue. If not, then at 908, it may be determined if the dependency queue lock request has a corresponding shadow lock request in the lock grant queue. If so, then at 910, the shadow lock request in the lock grant queue may be unshadowed. Whenever used in this document, the term "unshadowed" shall refer to the taking of a lock grant queue having a shadowed lock request and making the lock grant queue contain a lock request covering the same region as the shadowed lock request. This may be accomplished by, for example, simply converting the shadowed lock request into a non-shadowed lock request in the lock grant queue (which may involve changing certain attributes of the request). It may alternatively involve deleting the shadow lock request and adding a new lock request covering the same region. Other ways to unshadow the lock request are possible as well.

If the dependency queue lock request does not have a corresponding shadow lock request, then at 912 the dependency queue lock request may be placed in the lock grant queue. Then at 914, the dependency queue lock request may be removed from the dependency queue. Then at 916, a message may be sent to the lock client who sent the dependency queue lock request indicating that the dependency queue lock request has been granted.

If at 906 it was determined that the dependency queue lock request conflicted with a second lock request in the lock grant queue, then at 918 it may be determined if a shadow lock request has been previously created for a lock request in this dependency queue. If not, then at 920, a shadow lock request for the dependency queue lock request may be created in the lock grant queue. At 922, the dependency queue lock request may be placed in a dependency queue corresponding to the second lock request. Then at 924, the dependency queue lock request may be removed from the dependency queue corresponding to the first lock request. Once either 924 or 916 has completed, at 926 it may be determined if there are any more lock requests in the dependency queue. If so, then the loop may proceed back to 906 for the next oldest region in the dependency queue. Once there are no more lock requests in the dependency queue, or if at 904 it was determined that there wasn't a corresponding dependency queue, then at 928 a message may be sent to the lock client indicating that the lock has been released.

In another example, lock managers and lock clients may be associated with XMAPs as an attribute of the exported VLUN volumes. Each DPP to which the VLUN has been exported may keep an XMAP for the VLUN. The XMAP is a data structure that allows the dividing of a VLUN into one or more regions, wherein each XMPA entry describes a VLU region and assigns attributes to those VLUN regions. This allows the lock manager and lock client to easily piggyback on top of the existing VLUN infrastructure.

In yet another example, lock clients may, upon receipt of an indication of a lock grant, keep the lock grant until such time as the lock manager requests the locks back. Thus, the lock clients do not send a lock release when the I/O is complete. Rather, the lock managers have the duty to detect that an outstanding lock request overlaps with an existing lock grant and request it back from the lock client that holds the lock. This allows subsequent I/Os on the same region going to the same lock manager to pass through without the lock client requesting a new lock (since the old one was not taken back yet, despite the completion of the prior I/O). This embodiment has an advantage of potentially low overhead costs as the locks are neither requested nor released by the client manager for every I/O.

Figure 10:
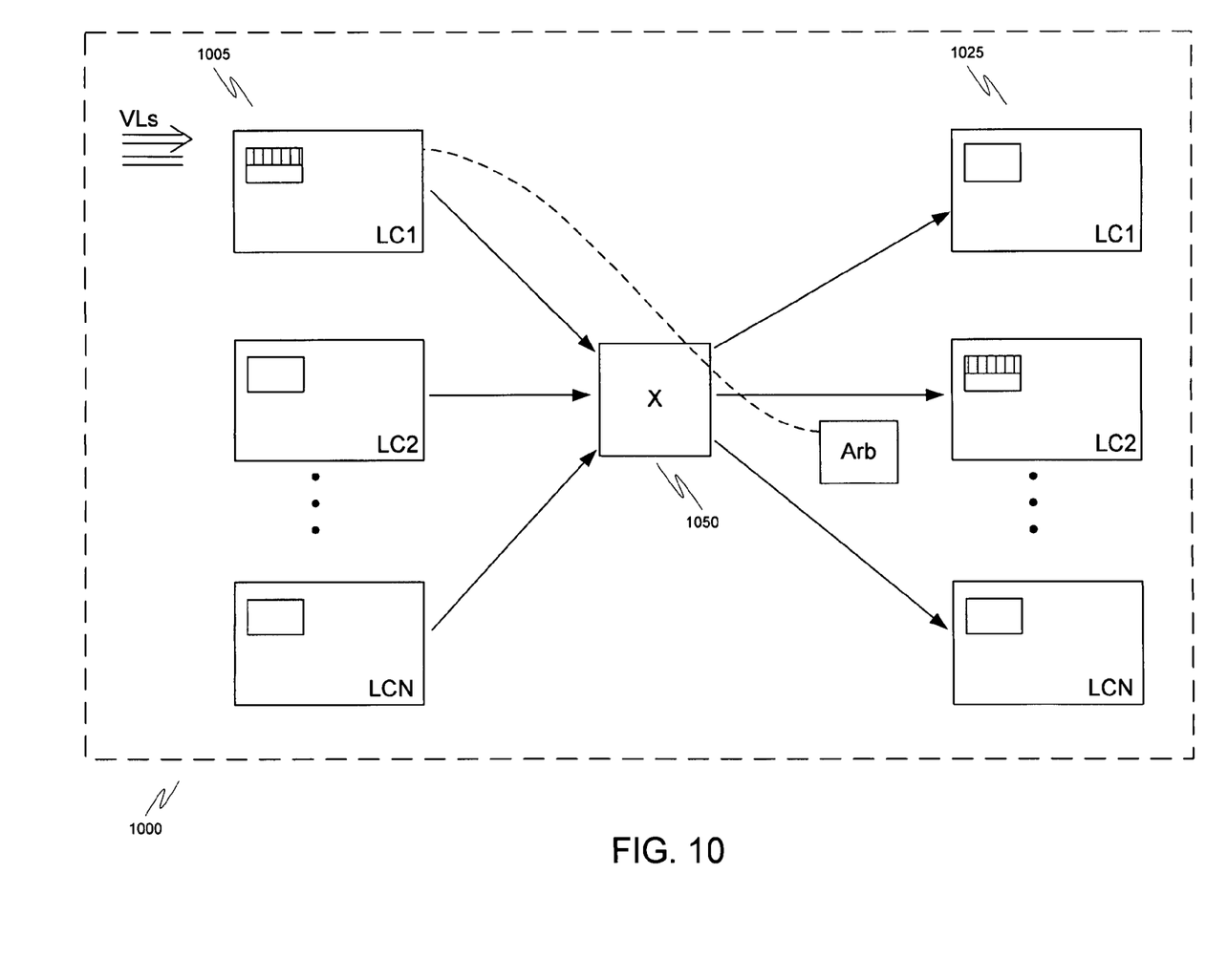
FIG. 10 is a simplified architecture of a switch.

FIG. 10 illustrates a simplified architecture of switch 1000. Switch 1000 includes N line cards, each of which characterized by an ingress side (or input) 1005 and an egress side (or output) 1025. Line card ingress sides 1005 are connected via switching fabric 1050, which includes a crossbar in this example, to line card egress sides 1025. In this embodiment, one or more of the processes described above is performed by one or more of the line cards.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. A method comprising:

receiving a request, at a lock client located on a first network device in a network including the first network device, a second network device, a host device, and at least one physical storage device, wherein the request is from the host device and is for an Input/Output (I/O) involving a region of memory of a virtual storage device, wherein the virtual storage device includes the least one physical storage device;

sending a lock request from the lock client to a lock manager located on the second network device, wherein at least one of the lock client or the lock manager is associated with an XMAP as an attribute of the virtual storage device, the XMAP comprising a data structure that allows dividing the virtual storage device into one or more regions, wherein each entry in the XMAP describes a Virtual Logical Unit Number (VLUN) region and indicates at least one of the lock client or the lock manager as attributes of the VLUN region;

receiving, at the lock client, an indication from the lock manager that the lock request is granted;

allowing the I/O to be performed on the region of memory of the virtual storage device in response to the receipt of the lock request grant indication; and releasing the granted lock at the lock client responsive to a release request from the lock manager.

2. The method of claim 1, wherein the first network device and the second network device are located on a single physical network device but are respectively controlled by different software.

3. The method of claim 1, wherein the first network device and the second network device are data path processors (DPPs) in one or more storage services modules (SSMs).

4. The method of claim 3, wherein each DPP to which the virtual storage device has been exported keeps an XMAP for the virtual storage device.

5. The method of claim 1, wherein the sending a lock request includes embedding the lock request in a Fibre Channel Protocol (FCP) packet.

6. The method of claim 1, wherein each XMAP entry describes a virtual storage device region and assigns attributes to the virtual storage device region.

7. A switch comprising:

one or more data path processors (DPPs), wherein at least one of the DPPs has associated with it a lock client, wherein the lock client is configured to:

receive a request from a host device for an Input/Output (I/O) involving a region of memory of a virtual storage device, wherein the virtual storage device includes at least one physical storage device;

send a lock request from the lock client to a lock manager, wherein at least one of the lock client or the lock manager is associated with an XMAP as an attribute of the virtual storage device, the XMAP comprising a data structure that allows dividing the virtual storage device into one or more regions, wherein each entry in the XMAP describes a Virtual Logical Unit Number (VLUN) region and indicates at least one of the lock client or the lock manager as attributes of the VLUN region;

receive, at the lock client, an indication from the lock manager that the lock request is granted;

allow the I/O to be performed on the region of memory of the virtual storage device in response to the receipt of the lock request grant indication; and release the granted lock at the lock client responsive to a release request from the lock manager.

8. The switch of claim 7, wherein each XMAP entry describes a virtual storage device region and assigns attributes to the virtual storage device region.

9. The switch of claim 7, wherein each DPP to which the virtual storage device has been exported keeps an XMAP for the virtual storage device.

10. The switch of claim 7, wherein the lock client and the lock manager are located on the same switch but are respectively controlled by different software.

11. The switch of claim 7, wherein sending a lock request includes embedding the lock request in a Fibre Channel Protocol (FCP) packet.

12. A switch comprising:

one or more data path processors (DPPs), wherein at least one of the DPPs has associated with it a lock client, wherein the lock client is configured to:

receive a request from a host device for an Input/Output (I/O) involving a region of memory of a virtual storage device, wherein the virtual storage device includes at least one physical storage device, wherein the virtual storage device comprises a Virtual Logical Unit Number (VLUN) volume;

send a lock request from the lock client to a lock manager, wherein at least one of the lock client or the lock manager is associated with an XMAP as an attribute of the VLUN volume, the XMAP comprising a data structure that allows dividing the VLUN into one or more regions, wherein each entry in the XMAP describes a Virtual Logical Unit Number (VLUN) region and indicates at least one of the lock client or the lock manager as attributes of the VLUN region;

receive, at the lock client, an indication from the lock manager that the lock request is granted;

allow the I/O to be performed on the region of memory of the virtual storage device in response to the receipt of the lock request grant indication; and release the granted lock at the lock client responsive to a release request from the lock manager.

13. An apparatus comprising:

means for receiving a request, at a lock client located on a first network device in a network including the first network device, a second network device, a host device, and at least one physical storage device, wherein the request is from the host device and is for an Input/Output (I/O) involving a region of memory of a virtual storage device, wherein the virtual storage device includes the least one physical storage device;

means for sending a lock request from the lock client to a lock manager located on the second network device, wherein at least one of the lock client or the lock manager is associated with an XMAP as an attribute of the virtual storage device, the XMAP comprising a data structure that allows dividing the virtual storage device into one or more regions, wherein each entry in the XMAP describes a Virtual Logical Unit Number (VLUN) region and indicates at least one of the lock client or the lock manager as attributes of the VLUN region;

means for receiving, at the lock client, an indication from the lock manager that the lock request is granted;

means for allowing the I/O to be performed on the region of memory of the virtual storage device in response to the receipt of the lock request grant indication; and means for releasing the granted lock at the lock client responsive to a release request from the lock manager.

\* \* \* \* \*